United States Patent [19]

Lasner

[11] Patent Number: 5,054,656

[45] Date of Patent: Oct. 8, 1991

[54] FLUID CONTAINER WITH PUMP AND ATTACHED DOSAGE DISPENSER

[76] Inventor: Jeffrey I. Lasner, 4 Baltusrol Dr., Purchase, N.Y. 10577

[21] Appl. No.: 338,224

[22] Filed: Apr. 14, 1989

[51] Int. Cl.⁵ .............................................. B67D 5/38
[52] U.S. Cl. .................................. 222/158; 222/385; 141/380
[58] Field of Search ............... 222/109, 154, 158, 192, 222/309, 321, 341, 372, 380, 382–383, 385; 141/369, 372–373, 378–381, 386

[56] References Cited

U.S. PATENT DOCUMENTS

| | | | |
|---|---|---|---|
| 304,219 | 8/1884 | Metzger | 222/380 |
| 511,440 | 12/1893 | Luce | 141/378 X |
| 1,547,450 | 7/1925 | Schroeder | 222/383 X |
| 1,956,876 | 5/1934 | Prescott | 222/383 X |
| 3,124,275 | 3/1964 | Lake | 222/321 X |
| 3,251,387 | 5/1966 | Shirley et al. | 141/375 |
| 3,599,684 | 8/1971 | Elias | 141/369 |
| 4,212,332 | 7/1980 | Kutik et al. | 141/98 |
| 4,550,862 | 11/1985 | Barker et al. | 222/109 |

Primary Examiner—Michael S. Huppert
Attorney, Agent, or Firm—Alfred E. Miller

[57] ABSTRACT

A fluid container with a removably attached dosage dispenser receptacle in which the container is provided with a pump for pumping up fluid to the receptacle in predetermined dosages. An opening in the receptacle is aligned with the pump outlet conduit so that fluid can be pumped directly through the outlet conduit to the receptacle in predetermined amounts, and the dispenser can be detached from the container for use when required.

3 Claims, 3 Drawing Sheets

FLUID CONTAINER WITH PUMP AND ATTACHED DOSAGE DISPENSER

The present invention relates to a liquid or fluid container having an internal pump for pumping fluid from the container into an attached graduated dosage dispenser. Thus, an amount of liquid or fluid from the associated container can be pumped at will into a graduated or non-graduated detachable dispenser.

SUMMARY OF THE INVENTION

It is an object of the present invention to provide an improved dosage dispenser for fluids such as medicines, mouthwash, or in the alternative, for liquid food products and liquid cleaning materials, etc.

Another object of the present invention is to provide an easy method of dispensing prescription medicines and the like for elderly and disabled persons who have difficulty in handling medicine bottles and especially in pouring out the prescribed amount of medicine, when required.

It is another object of the present invention to provide a fluid dispenser having an internal pump together with an attached receptacle, in the form of a cup, or spoon which additionally serves as a cover for the external parts of the pump mechanism, and when removed, functions as a cup receptacle or spoon to receive dosage portions of the fluid pumped up and out from the fluid container.

It is a further object of the present invention to provide a combined fluid container and dosage dispenser in a single unit to which the dosage dispenser can be easily removed from the fluid container, when required, and easily reattached.

BRIEF DESCRIPTION OF THE DRAWINGS

In order that the invention will be more clearly understood, it will now be disclosed in greater detail with reference to the accompanying drawings, in which.

DESCRIPTION OF THE PREFERRED EMBODIMENTS

Figure 1:
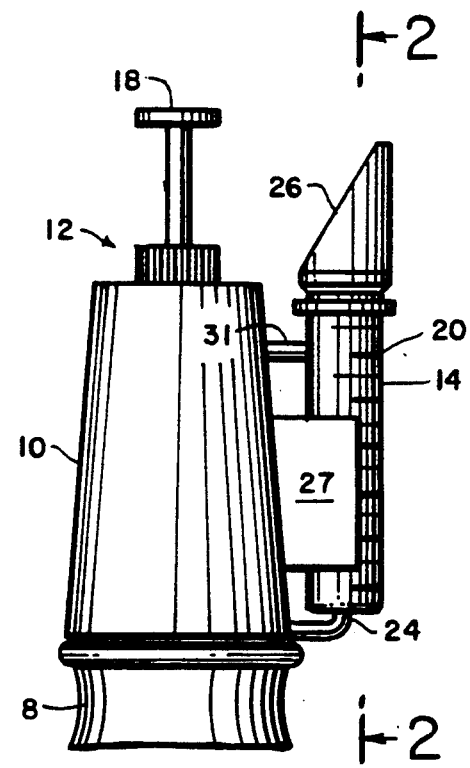
FIG. 1 is a side elevational view of the fluid container with pump and attached dosage dispenser constructed in accordance with the teachings of my invention.

Referring more particularly to the device shown in FIGS. 1-4, a container 8 has an upper housing 10 that is provided with a pump mechanism referred to generally by the numeral 12, and which is removably inserted within the container and functions to pump-up fluid or liquid in the container to the attached dosage dispenser 14. The pump 12 is provided with a hollow tube 15 reaching below the fluid level in container 8, a plunger 16 and a actuating finger piece 18.

Figure 2:
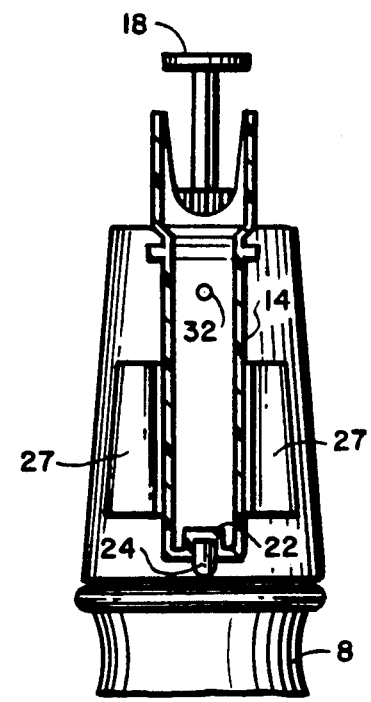
FIG. 2 is a view taken along the lines 2—2 of FIG. 1.
Figure 4:
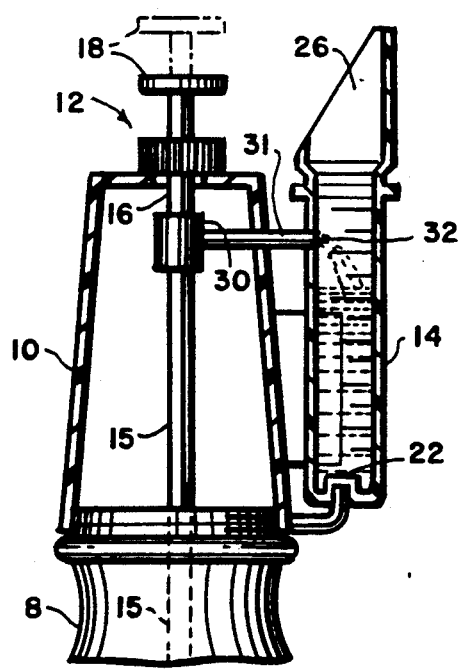
FIG. 4 is a sectional view similiar to FIG. 1 in which the pump handle is shown in two positions, and in which fluid is shown dispensed from the pump spigot into the dosage dispenser.
Figure 3:
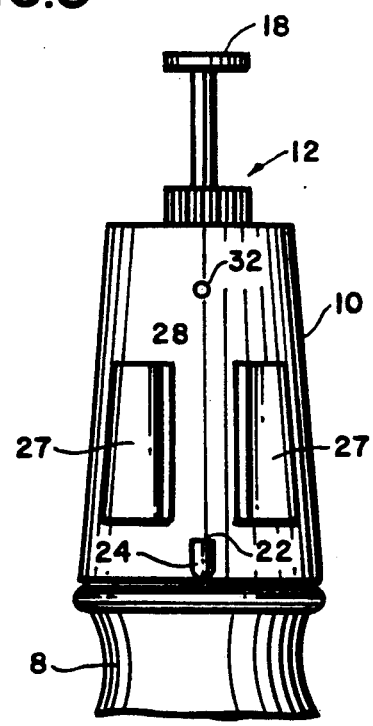
FIG. 3 is a front elevational view similiar to FIG. 2, however with the dosage dispenser detached.

As seen in FIG. 1 the dosage dispenser 14 is provided with a series of graduations 20 which are visible on the outer surface of the dispenser. It will be apparent that in the base of the upper housing 10 of the container 8 is an L-shaped projection is provided in which the upstanding finger 24 is adapted to be seated within the recess 22 in the dosage dispenser 14. At the other end of the dosage dispenser is a triangular-shaped mouth piece 26 for dispensing the liquid in a graduated dosage to the user. Furthermore, as seen in FIGS. 1-3, dosage dispenser 14 is snuggly fitted within a pair of guides 27 on either sides of the space 28 which is constructed to accomodate the dosage dispenser therein. As seen in the FIGS. 1-4 the pump spigot 30 is shown projecting through an opening in the upper housing 10 in which the extreme end is aligned with the opening 32 in the dosage dispenser 14. Thus, when the dosage dispenser 14 is removably attached to the upper housing 10 the upstanding finger 24 is inserted in the recess 22 of the dosage dispenser while the pump spigot 30 projects through the opening 31 in the upper housing 10 and is aligned with and enters a hole 32 in the dosage dispenser 14. Consequently, by pushing the finger piece 18 the fluid in the container 8 is pumped up by plunger 16 through the tube 15 and out the spigot 30, and through the opening 32 into the interior of the dosage dispenser 14 to a selected level, in accordance with the graduations thereon.

Figure 5:
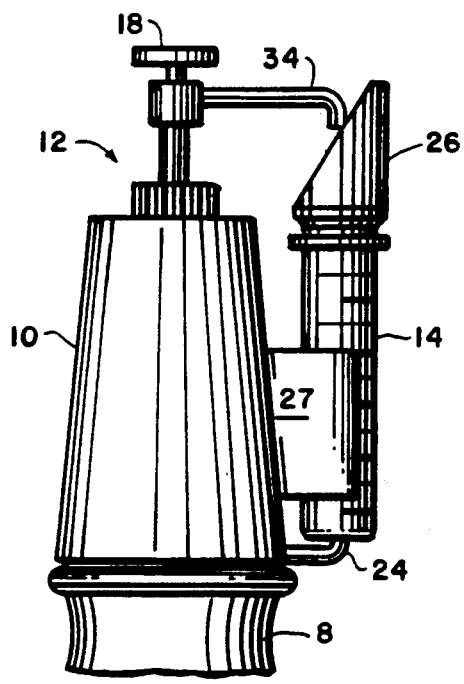
FIG. 5 is a alternate arrangement of the invention in which the pump dispenser spigot is located on top of the device instead of near the top of the container as shown in FIG. 1.
Figure 6:
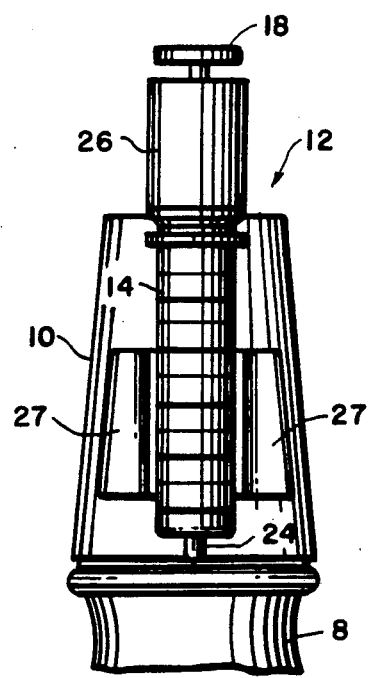
FIG. 6 is a front elevational view of the alternate embodiment, as shown in FIG. 5.

FIGS. 5 and 6 shown an alternate embodiment of the present invention in which like parts bear like reference numerals. The construction shown therein differs only in that the pump spigot 34 is located at the top of the pump and above the upper housing 10. In this embodiment the dosage dispenser 14 is not required to have an opening in the body portion since filling is achieved through the open top of the dispenser which, in this case, becomes a convenient dispenser.

Figure 7:
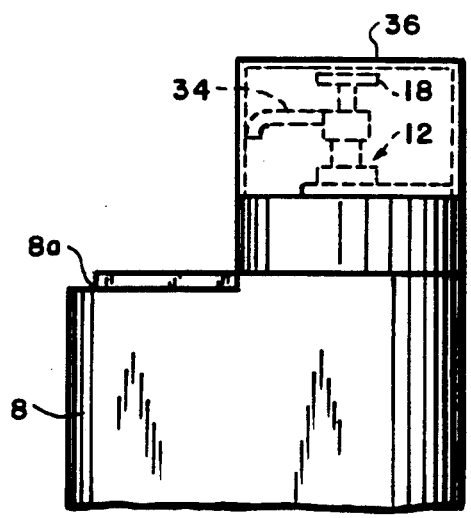
FIG. 7 is a further embodiment of the present invention in which the dosage dispenser, or cup, also forms the cover for the external parts of the pump, when not in use.
Figure 8:
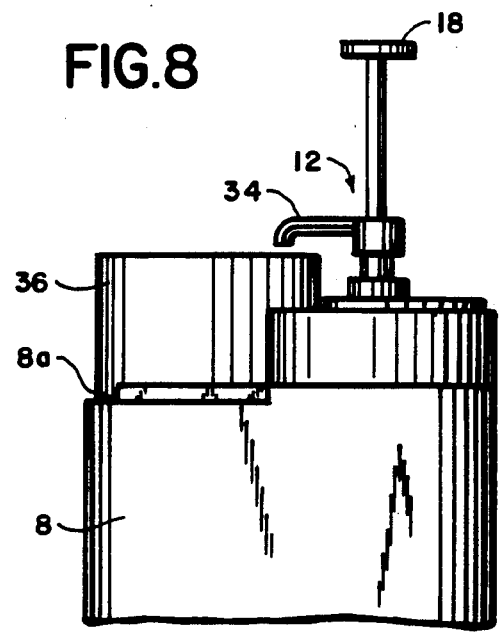
FIG. 8 is a view similar to FIG. 7, however with the dosage dispenser receptacle removed and inverted to be used as a cup for receiving the liquid dispensed from the container.
Figure 9:
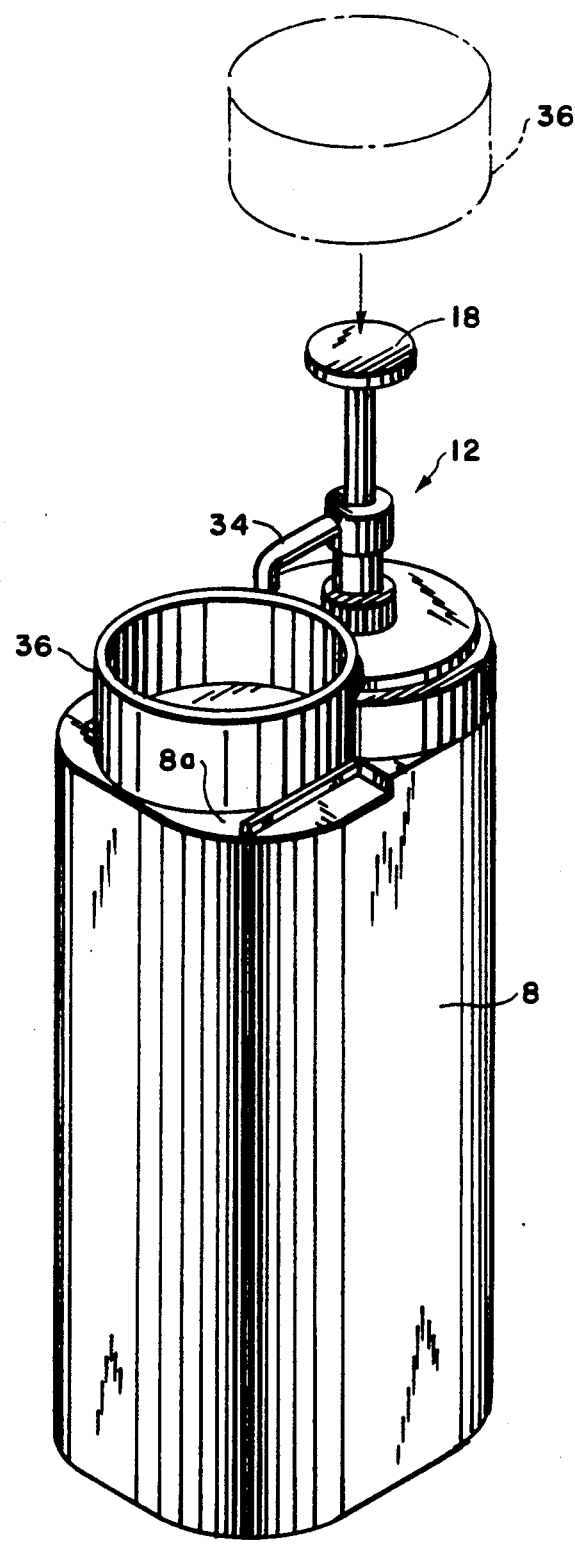
FIG. 9 is perspective view of the embodiment of the invention shown in FIG. 8.

Referring not to FIGS. 7-9, a further embodiment of the present invention is shown in which the fluid container 8 is illustrated as having a substantially rectangular shape in which the top 8a is both flat and broad, and can accomodate both the pump mechanism 12 as well as the dosage receptacle 36. FIG. 7 shows the assembly in the packaged form, prior to use, wherein the container 36 is inverted and placed over the pump mechanism. The latter is shown in its depressed conditions, the container being held on the periphery of the pump mechanism by friction. Furthermore, the entire assembly of the fluid container, dosage receptacle and pump can be sealed by means of shrink-wrapping, so as to be virtually tamper-proof. This arrangement will therefore be particularly suitable for enhanced product security. When the assembly is desired to be used, the wrapping is removed and the dosage receptacle is inverted and placed on the flat shoulder 38 of the fluid container 8 in a position for pumping a predetermined amount of fluid from the container into the dosage receptacle 36. While the dosage receptacle 36 may have a flat bottom surface, it may, in alternative, have a bottom recess 38, as seen in FIG. 8 which can snuggly fit over an elevation or lip 40 on the top surface 8a of container 8.

While the invention has been disclosed and described herein with reference to several embodiments thereof, it is apparent that other variations and modifications of my invention may be made which fall within the true spirit and scope of the invention as defined in the following claims.

I claim:

1. A fluid container and dosage dispenser receptacle assembly comprising a dosage dispenser receptacle and pump in said container having an outlet pipe, said dosage dispenser receptacle having at least one opening, spaced guides on said fluid container for removably holding said dosage dispenser receptacle, a projection on said container and a corresponding recess in the bottom of said dosage dispenser receptacle for receiving the projection when the receptacle is correctly aligned relative to said container whereby said outlet pipe is aligned with said opening in the dispenser receptacle for pumping predetermined amounts of fluid therein.

2. A fluid container and dosage dispenser assembly as claimed in claim 1, wherein said dosage dispenser receptacle is provided with graduations thereon for determining from the exterior thereof the correct dosage of fluid to be pumped into said dosage dispenser receptacle from said container.

3. A fluid container and dosage dispenser assembly comprising a dosage dispenser receptacle and a pump in said container having an outlet pipe, said dosage dispenser receptacle having a filling opening and a dispensing opening, said filling opening being in the side of said receptacle adjacent to said container and in the upper part of said receptacle, and means on said assembly for removably holding and automatically orienting said dosage dispenser receptacle when said receptacle is in an attached condition whereby said pump outlet pipe is aligned with said filling opening in the dispenser receptacle for pumping predetermined amounts of fluid therein.

* * * * *